US008883314B2

(12) United States Patent
Chang et al.

(10) Patent No.: US 8,883,314 B2
(45) Date of Patent: Nov. 11, 2014

(54) COATED ARTICLES WITH IMPROVED FINGERPRINT RESISTANCE AND METHODS OF MAKING SAME

(75) Inventors: Theresa Chang, Painted Post, NY (US); Robert Randall Hancock, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 289 days.

(21) Appl. No.: 13/351,571

(22) Filed: Jan. 17, 2012

(65) Prior Publication Data

US 2012/0189843 A1 Jul. 26, 2012

Related U.S. Application Data

(60) Provisional application No. 61/435,994, filed on Jan. 25, 2011.

(51) Int. Cl.

*B05D 3/00* (2006.01)
*C09D 143/04* (2006.01)
*C09D 133/14* (2006.01)
*C03C 17/30* (2006.01)
*B05D 5/08* (2006.01)

(52) U.S. Cl.

CPC .............. *C03C 17/30* (2013.01); *C09D 133/14* (2013.01); *C09D 143/04* (2013.01); *B05D 5/083* (2013.01)

USPC ........... 428/421; 428/337; 428/429; 428/447; 428/522; 427/387

(58) Field of Classification Search

None

See application file for complete search history.

(56) References Cited

U.S. PATENT DOCUMENTS

| | | | | |
|---|---|---|---|---|
| 3,332,926 | A | 7/1967 | Baron et al. | 260/93.7 |
| 3,345,352 | A | 10/1967 | Baron et al. | 260/93.7 |
| 3,558,345 | A | 1/1971 | Baum et al. | 117/54 |
| 3,647,489 | A * | 3/1972 | McMillan et al. | 501/7 |
| 2003/0204018 | A1 * | 10/2003 | Granel et al. | 525/100 |
| 2004/0028914 | A1 * | 2/2004 | Yanome | 428/447 |
| 2006/0003168 | A1 | 1/2006 | Dadalas et al. | 428/421 |
| 2008/0118741 | A1 | 5/2008 | Michalczyk et al. | 428/331 |

FOREIGN PATENT DOCUMENTS

| | | | |
|---|---|---|---|
| EP | 0386379 B1 | 8/1984 | C03C 17/34 |
| EP | 0188065 B1 | 9/1990 | C03C 17/32 |
| EP | 0349804 B1 | 9/1992 | B05D 5/08 |
| EP | 0510546 B1 | 3/1995 | C23C 28/00 |

* cited by examiner

*Primary Examiner* — Ramsey Zacharia

(74) *Attorney, Agent, or Firm* — Timothy M. Schaeberle; Payal A. Patel

(57) ABSTRACT

Described herein are various articles that have improved resistance to the adverse effects observed when tactilely-transferable residue is contacted therewith, along with methods for their manufacture and use. The articles and methods generally make use of an adhesion binder that can be used to form a polymer network around a solvent-soluble fluoropolymer to adhere the fluoropolymer to the surface of the article substrate.

20 Claims, No Drawings

COATED ARTICLES WITH IMPROVED FINGERPRINT RESISTANCE AND METHODS OF MAKING SAME

CROSS-REFERENCE TO RELATED APPLICATION

This application claims the benefit of priority under 35 U.S.C. §119 of U.S. Provisional Application Ser. No. 61/435,994, filed on 25 Jan. 2011, the content of which is relied upon and incorporated herein by reference in its entirety as if fully set forth below.

TECHNICAL FIELD

The present disclosure relates generally to fingerprint-resistant or anti-fingerprint coatings. More particularly, the various embodiments described herein relate to articles having non-stick, hydrophobic coatings disposed thereon such that the coated articles exhibit improved fingerprint-resistance, as well as to methods of making and using the coated articles.

BACKGROUND

Methods of applying so-called "non-stick" coating materials for a variety of applications have long been of interest. Such applications have included the production of non-stick cookware, improving the wear resistance of joints under load, and stain resistant appliances, among others. More recently, such materials have been investigated for use in applications where fingerprint-resistance is desirable (e.g., touch-activated or touch-interactive devices).

By virtue of their designed "non-stick" nature, it traditionally has been difficult to apply these materials to a substrate such that the non-stick material sticks or remains on the substrate, particularly when the substrate materials were not compatible with the coating materials. To overcome these inherent difficulties, methods of bonding non-stick agents to metal or glass have been developed. For example, some of these methods include the use of compatibilizing agents (e.g., a primer). Mechanical solutions such as roughening the surface of the substrate also have been used to improve the adhesion of non-stick materials to a surface.

By way of illustration, according to one such method, the adhesion of polytetrafluoroethylene (PTFE), such as that sold by DuPont using the trademark TEFLON, or other non-stick coating materials on cookware or bakeware can be improved by first roughening the surface of the cookware or bakeware. This roughening can enable improved adhesion of a primer coating to the surface of the cookware. The primer can then be applied in a manner that retains the roughened surface structure. The PTFE or other non-stick material resin can then be applied to the primed, roughened surface. Subsequently, the resin-coated article can be heated to a temperature above the glass transition temperature (Tg) of the PTFE or other non-stick material resin. This thermal treatment physically entraps the resin layer over the primer and within the roughened portion of the surface.

It should be noted that, while the non-stick material may adhere to a primer using such methods, there is no covalent bonding of the non-stick coating to the substrate surface. Thus, these methods can be unsuitable for applications where frequent user or tactile interactions with the coated surface occur. That is, as a user interacts with or contacts such a coated surface, it is possible that at least a portion of the coating delaminates or becomes otherwise removed.

In addition, the use of mechanical roughening and/or primers or other agents that render the non-stick material compatible to a given surface can result in non-transparent and/or hazy articles. While these technologies may be acceptable for applications where optical properties are of minimal concern, they would not be adequate for applications where properties such as optical transparency, optical transmission, haze, or the like are important.

There accordingly remains a need for technologies that provide surfaces with improved compatibility and/or adhesion with non-stick materials. It would be particularly advantageous if such technologies could produce coated articles that did not diminish the optical qualities of the surface itself and/or that exhibit high wear resistance against user interactions. It is to the provision of such technologies that the present disclosure is directed.

BRIEF SUMMARY

Described herein are various articles that have improved resistance to the adverse effects observed when tactilely-transferable residue is contacted therewith, along with methods for their manufacture and use.

One type of coated article includes a substrate and a fingerprint-resistant coating composition disposed on a surface of the substrate. The fingerprint-resistant coating composition can include an at least partially crosslinked adhesion binder and a fluoropolymer, which, in certain implementations, can be an amorphous polymer. The adhesion binder can include a copolymer comprising a combination of fluoroalkyl-containing monomers and silane-containing monomers. The silane-containing monomers of the adhesion binder can chemically adhere to the surface of the substrate and can be at least partially crosslinked to form a polymer network around the fluoropolymer.

In certain situations, the substrate includes a silicate glass, borosilicate glass, aluminosilicate glass, or boroaluminosilicate glass, and optionally comprises an alkali or alkaline earth modifier. In other situations, the substrate includes a glass-ceramic comprising a glassy phase and a ceramic phase, wherein the ceramic phase comprises β-spodumene, β-quartz, nepheline, kalsilite, or carnegieite. Regardless of the material chosen, in certain implementations of this coated article, the substrate can have an average thickness of about 0.02 millimeters to about 2 millimeters.

The fluoroalkyl-containing monomers of the at least partially crosslinked adhesion binder can include fluoroalkyl-methacrylate monomers and/or fluoroalkyl-alkyl-methacrylate monomers. Similarly, the silane-containing monomers of the at least partially crosslinked adhesion binder comprises alkoxysilylmethacrylate monomers and/or alkoxysilyl-alkyl-methacrylate monomers.

The final coated article is capable of exhibiting a haze of less than or equal to about 5 percent and/or an optical transmittance of greater than or equal to about 92 percent over a visible spectrum of light. In certain cases, after 1000 wipes with a microfiber cloth using a Crockmeter (ASTM D6279 2007), a contact angle between the coated article and water can be greater than 110 degrees.

One type of method of making a coated article includes the steps of providing a substrate, disposing a fingerprint-resistant coating material on at least a portion of a surface of the substrate, wherein the fingerprint-resistant coating material comprises an adhesion binder and a fluoropolymer, wherein the adhesion binder comprises a copolymer comprising a combination of fluoroalkyl-containing monomers and silane-containing monomers, and at least partially crosslinking the adhesion binder to physically intertwine the at least partially crosslinked adhesion binder and the fluoropolymer in a three-dimensional network on the at least the portion of the surface of the substrate.

Another type of coated glass article includes a glass substrate and a coating composition on the substrate, wherein the coating composition consists essentially of (1) perfluoroalkyl-alkyl-methacrylate random copolymers derived with trimethoxysilylmethacrylate and (2) an amorphous fluorocarbon polymer. The coated glass article can have a water contact angle greater than 115° after 1000 wipes with a microfiber cloth using a Crockmeter (ASTM D6279 2007). The coated article also can have a visible light transmittance that is greater than or equal to 95% of the transmittance of the uncoated glass used to make the article. Further, the coated article can have a haze value less than about 3 percent.

Another type of method of making a coated glass article includes the steps of providing a glass substrate, providing a solution consisting of a mixture of a random copolymer of perfluoroalkyl-alkyl-methacrylate with trimethoxysilylmethacrylate and an amorphous fluorocarbon, coating the glass substrate with the mixture, and curing the glass substrate having the mixture thereon. In certain cases, the curing can be selected from the group consisting of thermal curing and UV curing. In cases of thermal curing, a temperature used can be less than about 300° C.

It is to be understood that both the foregoing brief summary and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Referring now to the figures, wherein like reference numerals represent like parts throughout the several views, exemplary embodiments will be described in detail. Throughout this description, various components may be identified having specific values or parameters. These items, however, are provided as being exemplary of the present disclosure. Indeed, the exemplary embodiments do not limit the various aspects and concepts, as many comparable parameters, sizes, ranges, and/or values may be implemented. Similarly, the terms "first," "second," "primary," "secondary," "top," "bottom," "distal," "proximal," and the like, do not denote any order, quantity, or importance, but rather are used to distinguish one element from another. Further, the terms "a," "an," and "the" do not denote a limitation of quantity, but rather denote the presence of "at least one" of the referenced item.

Described herein are various articles that have improved resistance to the adverse effects observed when tactilely-transferable residue is contacted therewith, along with methods for their manufacture and use. The articles and methods generally make use of an adhesion binder that can be used to form a polymer network around a solvent-soluble fluoropolymer to mechanically secure the fluoropolymer to the surface of the article substrate. The resulting coatings, which are at least substantially hydrophobic and at least substantially oleophobic, beneficially provide the articles with improved fingerprint resistance relative to similar or identical articles that lack the coating. In addition, and as will be described in more detail below, the coated articles can exhibit high transmission, low haze, and high durability, among other features, both before and after application of tactilely-transferable residue thereto.

As used herein, the terms "anti-fingerprint," "fingerprint resistance," or "fingerprint-resistant" refer to the ability of a surface to resist the visible transfer of residue from tactile interactions with a user; the non-wetting properties of a surface with respect to such tactilely-transferable residue; the minimization, hiding, or obscuring of tactilely-transferable residue on a surface; and combinations thereof. An anti-fingerprint or fingerprint-resistant surface should therefore be substantially resistant to both water and oil transfer when tactilely contacted by a user. Stated another way, an anti-fingerprint or fingerprint-resistant surface should be at least substantially hydrophobic and at least substantially oleophobic.

In addition, the term "hydrophobic" is used herein to refer to a material that imparts a wetting characteristic such that the contact angle between water and a surface formed from the material is greater than 90 degrees (°). The term "substantially hydrophobic" is used herein to refer to a material that imparts a wetting characteristic such that the contact angle between water and a surface formed from the material is greater than 80°. Similarly, the term "oleophobic" is used herein to refer to a material that imparts a wetting characteristic such that the contact angle between oleic acid and a surface formed from the material is greater than 90°. Analogously, the term "substantially oleophobic" is used herein to refer to a material that imparts a wetting characteristic such that the contact angle between oleic acid and a surface formed from the material is greater than 80°.

Further, the term "tactilely-transferable residue" is used herein for convenience to generically refer to and encompass any undesirable residue that is contacted with, and transferred to, a surface by a given user. This includes natural human-oils or grease, as well as any other materials coupled therewith (e.g., dirt, cosmetics, food particles, hand creams/lotions, or the like) that are contacted with, and transferred to, the surface via a finger, palm, wrist, forearm/elbow (e.g., when an appliance door is closed or otherwise manipulated by a forearm or an elbow), or other body part.

As stated above, the improved articles and methods described herein implement an adhesion binder to provide a mechanical linkage between a fluoropolymer material and a substrate with which the fluoropolymer is incompatible (i.e., the fluoropolymer does not directly chemically bond with the surface of the substrate on its own). The adhesion binder generally comprises a portion of a composition used to form a fingerprint-resistant coating on the surface of the substrate or article to be coated.

For the avoidance of doubt, the term "adhesion binder" is used herein to refer to a copolymer (which can be random or ordered) that comprises a combination of fluoroalkyl-containing monomers and silane-containing monomers. The fluoroalkyl-containing monomers generally serve to render the adhesion binder compatible with the fluoropolymer that is desired to be coated on the substrate. The silane-containing monomers serve the dual purposes of 1) chemically adhering directly to the surface of the substrate and 2) at least partially crosslinking to form a polymer network around the fluoropolymer that is desired to be coated on the substrate. Thus, the adhesion binder mechanically binds the desired fluoropolymer material to the surface of the substrate without the need for a separate primer material or chemical adhesion promoter, and without using mechanical roughening or another surface modification to facilitate the linkage.

The improved articles described herein generally include a substrate and a fingerprint-resistant coating disposed on at least a portion of a surface of the substrate. The fingerprint-resistant coating is formed from the adhesion binder and a fluoropolymer, such that the crosslinked adhesion binder and the fluoropolymer are physically intertwined in a three-dimensional (3D) network on the portion or entirety of the surface of the substrate.

The substrate material will be chosen based on the particular use of the coated article. In general, however, a variety of substrates can be used. For example, the substrate can be a glass material, a glass-ceramic material, a ceramic material, a polymeric material, a metal, an alloy, or the like. The breadth of substrate choice is only limited by the provisos that the surface of substrate (on which the fingerprint-resistant coating will be disposed) will generally be incompatible with the fluoropolymer and compatible with the adhesion binder such that the silane-containing monomers of the adhesion binder can chemically bond to the surface. Thus, regardless of the choice of material for the substrate, the surface should comprise an oxygen atom or ion, or an oxygen-containing species (e.g., a hydroxyl or other like functional group or species), either of which can be inherent to the substrate or can be generated by a physical or chemical treatment as will be described below.

By way of illustration, with respect to glasses, the material chosen can be any of a wide range of silicate, borosilicate, aluminosilicate, or boroaluminosilicate glass compositions, which optionally can comprise one or more alkali and/or alkaline earth modifiers. One such glass composition includes the following constituents: 58-72 mole percent (mol %) $SiO_2$; 9-17 mol % $Al_2O_3$; 2-12 mol % $B_2O_3$; 8-16 mol % $Na_2O$; and 0-4 mol % $K_2O$, wherein the ratio $$\frac{Al_2O_3(\text{mol }\%)+B_2O_3(\text{mol }\%)}{\sum \text{modifiers (mol }\%)}$$

where the modifiers comprise alkali metal oxides. Another glass composition includes the following constituents: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO. Yet another illustrative glass composition includes the following constituents: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 parts per million (ppm) $As_2O_3$; and less than 50 ppm $Sb_2O_3$; wherein 12 mol %$\leq Li_2O+Na_2O+K_2O\leq$20 mol %, and 0 mol %$\leq$MgO+CaO$\leq$10 mol %. Still another illustrative glass composition includes the following constituents: 55-75 mol % $SiO_2$, 8-15 mol % $Al_2O_3$, 10-20 mol % $B_2O_3$; 0-8% MgO, 0-8 mol % CaO, 0-8 mol % SrO, and 0-8 mol % BaO.

Similarly, with respect to glass-ceramics, the material chosen can be any of a wide range of materials having both a glassy phase and a ceramic phase. Illustrative glass-ceramics include those materials where the glass phase is formed from a silicate, borosilicate, aluminosilicate, or boroaluminosilicate, and the ceramic phase is formed from β-spodumene, β-quartz, nepheline, kalsilite, or carnegieite.

If the substrate is formed from a ceramic material, it can be any of a variety of oxides, carbides, nitrides, oxycarbides, carbonitrides, or the like, whether in polycrystalline or single crystal form. One such ceramic is polycrystalline $Al_2O_3$. Another illustrative ceramic is polycrystalline SiC. Yet another illustrative ceramic material is single-crystal GaAs (e.g., as used in the fabrication of certain semiconductor devices).

If the substrate is formed from a polymer material, it can be chosen from a variety of thermosetting or thermoplastic materials, including those that are polides, polyesters, polyimides, polysulfones, polycarbonates, polyurethanes, polyurethane-ureas, polyolefins, phenols, epoxies, polyacrylates, polymethylacrylates, polystyrenes, polyhydroxy acids, polyanhydrides, polyorthoesters, polyphosphazenes, polyphosphates, copolymers thereof, blends thereof, or the like.

If the substrate is formed from a metal or alloy material, it can be chosen from a variety of commonly used metals or alloys. Such metals can include Ti, Fe, Al, Ni, Cr, Mo, V, or the like. Similarly, such alloys can include steel alloys, stainless steel alloys, Ni—Ti alloys, Cr—Mo alloys, brass alloys, bronze alloys, or the like.

Regardless of the material chosen therefor, the substrate can adopt a variety of physical forms. That is, from a cross-sectional perspective, the substrate can be flat or planar, or it can be curved and/or sharply-bent. Similarly, it can be a single unitary object, or a multi-layered structure or laminate.

Just as with the substrate, a variety of materials can be chosen for the fingerprint-resistant coating composition that is disposed on at least a portion of a surface of the substrate. As stated above, the fingerprint-resistant coating is formed from the adhesion binder and the fluoropolymer. That is, the fingerprint-resistant coating comprises the at least partially crosslinked adhesion binder and the fluoropolymer.

The components of the adhesion binder (i.e., the copolymer comprising a combination of fluoroalkyl-containing monomers and silane-containing monomers) can be selected based on the choice of fluoropolymer and substrate, respectively. Structurally, each of the fluoroalkyl-containing monomers and the silane-containing monomers has a backbone component, such that the backbone component of the fluoroalkyl-containing monomers polymerizes with the backbone component of the silane-containing monomers to form the copolymer, leaving the fluoroalkyl moieties or groups and the silane moieties or groups free to perform as intended (as described above). Thus, the fluoroalkyl-containing monomers comprise a backbone component and a fluoroalkyl component. Similarly, the silane-containing monomers comprise a backbone component and a silane component.

With respect to the fluoroalkyl-containing monomers, each backbone component can independently be based on an acrylate, a fatty acid salt, an olefin, or the like. The fluoroalkyl-containing component can be based on any saturated fluoroalkane. Based on these considerations, one exemplary category of fluoroalkyl-containing monomers includes (per)fluoroalkylmethacrylates, wherein the "alkyl" component of the fluoroalkane is a C4-C10 branched or linear chain alkane (i.e., $C_4F_9$, $C_5F_{11}$, $C_6F_{13}$, $C_7F_{15}$, $C_8F_{17}$, $C_9F_{19}$, and $C_{10}F_{21}$). Another exemplary class of fluoroalkyl-containing monomers includes (per)fluoroalkyl-alkyl-methacrylates (i.e., there is a linking group between the backbone component and the fluoroalkyl component), wherein the "alkyl" component of the fluoroalkane is a C4-C10 branched or linear chain alkane, and the alkyl component of the linking group is a C1-C6 branched or linear chain alkane (i.e., a non-fluorinated alkane).

With respect to the silane-containing monomers, each backbone component can independently be based on an acrylate, a fatty acid salt, an olefin, or the like. The silane-containing component can be based on any silane having an oxygen-containing species (e.g., hydroxyl, ether, ester, or like group or moiety). Based on these considerations, one exemplary category of silane-containing monomers includes alkoxysilylmethacrylates, wherein the silane component is a Si1-Si10 branched or linear chain silane at least partially substituted by an alkoxide that is a C1-C6 branched or linear chain alkane. Another exemplary class of silane-containing monomers includes alkoxysilyl-alkyl-methacrylates (i.e., there is a linking group between the backbone component and the silane component), wherein the silane component is a Si1-Si10 branched or linear chain silane at least partially substituted by an alkoxide that is a C1-C6 branched or linear chain alkane, and the alkyl component of the linking group is a C1-C6 branched or linear chain alkane.

Turning now to the fluoropolymer, it can be any fluoropolymer that is solution processable (i.e., the fluoropolymer must be dispersible or soluble in a solvent in which the adhesion binder is soluble or dispersible). Exemplary fluoropolymers are amorphous fluoropolymers, such as those commercially available from DuPont under the trademark TEFLON AF, or those commercially available from Asahi Glass Company under the trademark CYTOP.

Methods of making the above-described coated articles generally include the steps of providing a substrate, and forming the fingerprint-resistant coating on at least a portion of a surface of the substrate.

The selection of materials used in the substrates and fingerprint-resistant coatings can be made based on the particular application desired for the final coated article. In general, however, the specific materials will be chosen from those described above for the coated articles.

Provision of the substrate can involve selection of a substrate material as-manufactured, or it can entail subjecting the as-manufactured glass or glass-ceramic object to a treatment in preparation for forming the fingerprint-resistant coating. For example, in cases where the surface of the substrate is not compatible with the adhesion binder (i.e. the surface of the substrate does not comprise an oxygen atom or ion, or an oxygen-containing species), the surface can be treated to render it compatible with the adhesion binder. Examples of such pre-coating treatments, whether for compatibilizing purposes or not, include physical or chemical cleaning, physical or chemical strengthening, physical or chemical etching, physical or chemical polishing, annealing, shaping, and/or the like. Such processes are known to those skilled in the art to which this disclosure pertains.

Once the substrate has been selected and/or prepared, the fingerprint-resistant coating can be disposed thereon. Depending on the materials chosen, these coatings can be formed using a variety of techniques. It is important to note that the coatings described herein are not free-standing films that can be applied (e.g., via an adhesive or other fastening means) to the surface of the substrate, but are, in fact, physically formed on the surface of the substrate.

In general, the fingerprint-resistant coating is fabricated using any solution-based technique (e.g., spray coating, spin-coating, dip-coating, inkjetting, or the like), followed by a step of at least partially crosslinking the silane-containing monomers of the adhesion binder. Such processes are known to those skilled in the art to which this disclosure pertains.

For example, one such mechanism of forming the fingerprint-resistant coating involves first contacting the adhesion binder and the fluoropolymer with a solvent, which can be done sequentially in the same solvent, simultaneously in the same solvent, or separately in two samples of the same solvent (and then combining the two samples). The contacting step can involve dispersion or dissolution of the adhesion binder and/or the fluoropolymer. In exemplary embodiments, the fluoropolymer is completely soluble in the solvent. Next, the combined solution or dispersion of the adhesion binder, the fluoropolymer and the solvent are disposed on the surface of the substrate, followed by a step of crosslinking the silane-containing monomers (e.g., by heat, exposure to actinic radiation, or the like).

Once the coated article is formed, it can be used in a variety of applications where the coated article will come into contact with tactilely-transferable residue. These applications encompass touch-sensitive display screens or cover plates for various electronic devices (e.g., cellular phones, personal data assistants, computers, tablets, global positioning system navigation devices, and the like), non-touch-sensitive components of electronic devices, surfaces of household appliances (e.g., refrigerators, microwave ovens, stovetops, oven, dishwashers, washers, dryers, and the like), and vehicle components, just to name a few devices that might be tactilely manipulated or accessed.

Given the breadth of potential uses for the improved fingerprint-resistant coated articles described herein, it should be understood that the specific features or properties of a particular coated article will depend on the ultimate application therefor or use thereof. The following description, however, will provide some general considerations.

There is no particular limitation on the average thickness of the substrate contemplated herein. In many exemplary applications, however the average thickness will be less than or equal to about 15 millimeters (mm). If the coated article is to be used in applications where it may be desirable to optimize thickness for weight, cost, and strength characteristics (e.g., in electronic devices, or the like), then even thinner substrates (e.g., less than or equal to about 5 mm) can be used. By way of example, if the coated article is intended to function as a cover for a touch screen display, then the substrate can exhibit an average thickness of about 0.02 mm to about 2.0 mm.

In contrast to the substrate, where thickness is not limited, the average thickness of the fingerprint-resistant coating should be less than or equal to about 100 nanometers (nm). If the fingerprint-resistant coating is much thicker than this, it will have adverse effects on the haze, optical transmittance, scratch resistance, and/or durability of the final coated article. To illustrate, with thinner fingerprint-resistant coatings, a potential scratch to the surface can be resisted better by the more durable underlying substrate, because the scratch is actually absorbed by the underlying substrate rather than the coating. If the fingerprint-resistant coating is thicker than 100 nm on average, then the scratch will be absorbed by the coating itself and will be visible to the naked eye. Thus, in applications where high scratch resistance is important or critical (in addition to the improved fingerprint resistance provided by the fingerprint-resistant coating), the average thickness of the fingerprint-resistant coating should be less than or equal to 75 nm.

In general, the optical transmittance of the coated article will depend on the type of materials chosen. For example, if a transparent substrate is used without any pigments added thereto and/or the fingerprint-resistant coating is sufficiently thin, the coated article can have a transparency over the entire visible spectrum of at least about 85%. In certain cases where the coated article is used in the construction of a touch screen for an electronic device, for example, the transparency of the coated article can be at least about 92% over the visible spectrum. In situations where the substrate comprises a pigment (or is not colorless by virtue of its material constituents) and/or the fingerprint-resistant coating is sufficiently thick, the transparency can diminish, even to the point of being opaque across the visible spectrum. Thus, there is no particular limitation on the optical transmittance of the coated article itself.

Like transmittance, the haze of the coated article can be tailored to the particular application. As used herein, the terms “haze” and “transmission haze” refer to the percentage of transmitted light scattered outside an angular cone of ±4.0° in accordance with ASTM procedure D1003, the contents of which are incorporated herein by reference in their entirety as if fully set forth below. For an optically smooth surface, transmission haze is generally close to zero. In those situations when the coated article is used in the construction of a touch screen for an electronic device, the haze of the coated article can be less than or equal to about 5%.

Regardless of the application or use, the coated articles described herein offer improved fingerprint-resistance relative to identical articles that lack the fingerprint-resistant coatings described herein. While fingerprint resistance can appear to be a qualitative and potentially subjective characterization, there are a number of quantifiable indications of smudge-resistance, examples of which will now be described.

One quantifiable indication of this improved fingerprint resistance can be seen in the amount of tactilely-transferable residue that is actually transferred from a user to the article during use. That is, when a user tactilely interacts with the coated article, some amount of tactilely-transferable residue can transfer to the article. The mass of the tactilely-transferable residue on the coated article after each interaction can be quantified, for example, by weighing the mass thereof. In most situations, the amount of tactilely-transferable residue that is actually transferred from a user to the coated article is less than or equal to about 1 milligram (mg) per tactile contact or interaction. In some implementations, less than or equal to about 0.02 mg per tactile contact of such materials is transferred, while in other implementations, less than or equal to about 0.01 mg per tactile interaction of such materials is transferred.

Another quantifiable indication of the improved fingerprint resistance can be seen in the contact angles between the coated article and water and/or oleic acid (i.e., the hydrophobicity and/or the oleophobicity, respectively). In general, the coated articles described herein are at least substantially hydrophobic and at least substantially oleophobic. In some implementations, however, the contact angle between the coated article and water can be at least about 110°, and the contact angle between the coated article and oleic acid can be at least about 80°. In other implementations, these contact angles can be at least about 120° and at least about 90°, respectively.

In a specific embodiment, which may be particularly advantageous for applications such as touch sensitive electronic devices, a fingerprint-resistant coated article is formed using a chemically strengthened (ion exchanged) alkali aluminosilicate flat glass sheet as the substrate. The fingerprint-resistant coating is formed from a TEFLON AF fluoropolymer and an adhesion binder that comprises 2-(perfluorooctyl) ethylmethacrylate or ZONYL (a fluoro alkyl-containing monomer commercially available from DuPont) as the fluoroalkyl-containing monomer and 3-(trimethoxysilyl)propylmethacrylate or trimethoxysilylmethacrylate (“TMSMA”) as the silane-containing monomer. The fingerprint-resistant coating materials are disposed on the surface of the glass sheet by spin-coating. Subsequently, the coated glass sheet is heated to a temperature of less than 300° C. to bind the silane-containing monomer to the glass sheet and to crosslink the silane-containing monomer such that the TEFLON AF is entrapped within the crosslinked adhesion binder. The average thickness of the glass sheet is less than or equal to about 1 mm, and the average thickness of the methyl siloxane oleophilic coating is less than or equal to about 100 nm.

Such a coated article can be used in the fabrication of a touch screen display for an electronic device. The coated article can have an initial optical transmittance of at least about 95% and a haze of less than about 3.5%. The amount of tactilely-transferable residue that is actually transferred from a user to the coated article can be less than or equal to about 0.5 mg per tactile contact or interaction. Finally, the contact angle between the textured article and water can be at least about 115°, and the contact angle between the textured article and oleic acid can be at least about 82°.

Although many fluoropolymers are non-attaching materials and do not have functional groups by which to modify and adhere to various substrates, the use of the adhesion binders described herein can provide a coating material with suitable adhesion as well as optical properties and/or durability. The resulting coated articles can provide the following improvements over existing technologies:

1. Durability enhancement—Coating durability can be vastly improved.

2. One coat system (one coat and cure)—The adhesion binder can be mixed directly with the fluoropolymer that is desired to be coated and the resulting film can be cast in one step and cured in another step.

3. Cost—The adhesion binder is lower in cost than many fluoropolymer materials, and its use reduces the amount of fluoropolymer materials that are needed for same thickness film. Further, the use of additional solvents may not be necessary.

4. Versatility—The adhesion binder can be used as filler or as an additive to the fluoropolymer coating solution to improve the durability drastically. The adhesion binder and resulting coating composition are compatible with conventional coating techniques (e.g., dip coating, roller coating, and spin coating, among others).

The various embodiments of the present disclosure are further illustrated by the following non-limiting examples.

EXAMPLES

Example 1

Fabrication of Adhesion Binders

A first adhesion binder was synthesized using the following procedure. About 2.67 grams (g) (about 0.005 moles (mol), based on a molecular weight of about 534) of a fluoroalkylmethyacrylate monomer that is commercially available under the trademark ZONYL was combined with about 1.25 g (about 0.005 mol, based on a molecular weight of about 250) of TMSMA (i.e., 3-(trimethoxysilyl)-propylmethacrylate monomer) as well as about 10 milligrams (mg) (or about 0.0001 mol, based on a molecular weight of about 100) of azobisisobutyronitrile (“AIBN”), which is a thermal polymerization initiator, in about 10 milliliters (mL) THF in a 40 mL vial reaction vessel with an injection port and a stirrer bar. The reaction vessel was flushed with nitrogen, kept under nitrogen, and heated to about 70° C. for about 16 hours. Upon cooling to ambient or room temperature, the solution (which may be phase separated) was added to about 100 mL of ethanol and the resulting semi-solid was purified by trituration, decanting off the solvent and repeating the process with fresh ethanol. The resulting waxy semi-solid was filtered and dried under vacuum to yield a somewhat elastic white solid.

A second adhesion binder was synthesized using the exact same procedure, with the exception that, rather than ZONYL, a 2-(perfluorooctyl)-ethyl-methacrylate monomer was used as the fluoroalkyl-containing monomer. In this case, about 2.66 g (about 0.005 mol, based on a molecular weight of about 532.19) of the 2-(perfluorooctyl)-ethyl-methacrylate monomer was combined with about 1.25 g (about 0.005 mol, based on a molecular weight of about 250) of TMSMA as well as about 10 mg (or about 0.0001 mol, based on a molecular weight of about 100) of AIBN in about 10 milliliters (mL) THF in a 40 mL vial reaction vessel with an injection port and a stirrer bar. Once again, the reaction vessel was flushed with nitrogen, kept under nitrogen, and heated to about 70° C. for about 16 hours. Upon cooling to ambient or room temperature, the solution (which may be phase separated) was added to about 100 mL of ethanol and the resulting semi-solid was purified by trituration, decanting off the solvent and repeating the process with fresh ethanol. The resulting waxy semi-solid was filtered and dried under vacuum to yield a somewhat elastic white solid. This adhesion binder can be represented by the following structure, wherein m=n:

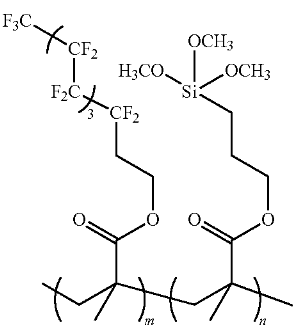

Example 2

Preliminary Evaluation of Adhesion Binder to Improve Durability

In this example, four sample sets of coatings were evaluated both qualitatively for coating durability/adhesion and quantitatively for coating hydrophobicity. The samples and procedures for making the samples are described below.

The substrates used for all sample sets were flat Corning GORILLA Glass sheets having a nominal composition of about 69.2 mol % $SiO_2$, about 8.5 mol % $Al_2O_3$, about 13.9 mol % $Na_2O$, about 1.2 mol % $K_2O$, about 6.5 mol % MgO, about 0.5 mol % CaO, and about 0.2 mol % $SnO_2$. In addition, for the sample sets where an adhesion binder was used, the adhesion binder was a random copolymer comprising 2-(perfluorooctyl)-ethyl-methacrylate and trimethoxysilylmethacrylate monomers (i.e., the second-described adhesion binder described in EXAMPLE 1). Finally, if a fluoropolymer was used, the fluoropolymer was a commercially available sample of TEFLON AF.

In general, each coating was spun-coated onto the substrates. To prepare the solution that was used to spin coat, the following procedure was generally used (with any exceptions described below). An about 1 weight percent (wt %) solution of TEFLON AF, in a fluoroether solvent, was combined with an about 1 wt % solution of adhesion binder in HFE7200 to produce a solution that was about 1 wt % in polymer mass. The solution was filtered through a coarse paper filter (e.g., a KIMWIPE plug, Kimberly-Clark, Dallas, Tex.) before use.

Once the spin coating solution was prepared, the surface of the glass substrates were cleaned prior to spin coating to remove any organic contaminants that might degrade adhesion. This entailed plasma treating (air plasma) the substrates for about 5 minutes prior to the spin coating step. About 0.5 mL of the spin coating solution was spread over a 2 inch×2 inch glass substrate. The spin coating conditions included a first ramp up to about 500 rpm over about 5 seconds, and holding at 500 rpm for about 10 seconds, followed by a second ramp up to about 3000 rpm over 10 seconds, and holding at 3000 rpm for about 30 seconds. The glass substrates were removed and allowed to sit overnight.

The coating on the glass samples were cross-linked by placing the coated glass samples in a slightly pre-heated oven held at about 100° C., followed by ramping the temperature from about 100° C. to about 165° C. at a rate of about 5 degrees per minute, maintaining the temperature at about 165° C. for about 15 minutes, ramping the temperature up to about 280° C. at about 5 degrees per minute, and holding the temperature at 280° C. for about 60 minutes. The samples were then allowed to cool to ambient temperature naturally.

Group 1: The samples under this designation were control samples formed using only the adhesion binder coated directly on the glass substrates. The adhesion binder was coated onto a glass substrate as a 1% solution in a perfluoroether solvent (HFE7200, 3M). In addition, the coating solutions for these samples were not filtered prior to spin coating.

Group 2: The samples under this designation were formed by coating TEFLON AF over an already-formed coating of the adhesion binder. Thus, two separate spin coating steps were performed before the crosslinking step.

Group 3: The samples under this designation were formed using a one-step process, where the TEFLON AF and the adhesion binder were combined and then coated onto the glass substrates as generically described above.

Group 4: The samples under this designation were control samples formed by coating a 1% solution of TEFLON AF in perfluoroether onto the glass substrates without using a primer, adhesion promoter, or other aid. In addition, the coating solutions for these samples were not filtered prior to spin coating.

The effectiveness of the coatings were evaluated by visual inspection of appearance for scratches and removal of polymer, and by water contact angle measurements to measure hydrophobicity.

Water and oil static contact angle measurements were obtained using a Drop Shape Analysis System (DSA100) from KRÜSS. An automatic dosing system was used to pipette about 2 microliters (uL) of distilled water or about 4 uL of oleic acid onto a sample. Contact angle measurements were obtained by averaging five drops across the length of the sample.

The durability of the coatings was tested by subjecting each sample to 100 wipes with a microfiber cloth (Standard Test Method for Rub Abrasion Mar Resistance of High Gloss Coatings, ASTM D6279 2007) and then measuring the contact angle again.

Table 1 shows the water contact angles of coatings on glass before and after the durability test (100 wipes using a Crockmeter).

TABLE 1

| Sample | Pristine coating | | 100 wipes | |
|---|---|---|---|---|
| Group | Average | Std Dev | Average | Std Dev |
| 1 | 66.7 | 7.3 | 85.1 | 3.0 |
| 2 | 124.1 | 0.4 | 113.3 | 0.5 |
| 3 | 122.2 | 0.6 | 123.4 | 1.5 |
| 4 | 123.7 | 0.6 | 26.6 | 2.8 |

Std Dev = standard deviation over 5 measured drops for each sample.

By visual inspection, there was little difference between the pristine coating samples and those that were subjected to 100 wipes with a Crockmeter for the samples of Group 3. There were a few scratches for the samples of Group 1. The coatings of Group 4 were all but gone after 100 wipes. For Group 2, it was visibly observed that a large portion of the TEFLON AF top coat had been removed after 100 wipes.

The visual data corresponded well with the water contact angle information, shown in Table 1. As can be seen from the data of Table 1, the use of the adhesion binder in conjunction with the fluoropolymer maintained a similar level of hydrophobicity after 100 wipes. That is, the water contact angle of the samples of Group 3 remained relatively unchanged while there was a substantial drop in the water contact angle when TEFLON AF was coated on top of the adhesion binder (i.e., as in Group 2). However, both these sample groups were a vast improvement to the samples of Group 4, which exhibited a nearly 100° drop in water contact angle. Similarly, the contact angle trends for each group were substantially mirrored when the oleic acid contact angles were measured.

Example 3

Adhesion Binder Comparison between the Use of ZONYL and 2-(Perfluorooctyl)-Ethyl-Methacrylate as the Fluoroalkyl-Containing Monomer The procedure described for preparing the samples of Group 3 of EXAMPLE 2 was used to evaluate the performance of the two different adhesion binders described in EXAMPLE 1. Based on the information available from DuPont, the fluoroalkyl methacrylate in the ZONYL samples was presumed to be a C8-based material that appeared to include a mixture of different fluoroalkyl methacrylates with the same average molecular weight as that described in the non-ZONYL adhesion binder of EXAMPLE 1.

The two adhesion binders performed (within experimental error) similarly in terms of TEFLON AF adhesion and coating mar resistance. With respect to hydrophobicity, however, the water contact angle for the coatings produced using the ZONYL-based adhesion binder was higher than the coatings produced using the non-ZONYL-based adhesion binder.

Example 4

TEFLON AF and Adhesion Binder Concentration Dependence

In this example, the sensitivity of the amount of adhesion binder to TEFLON AF was evaluated with respect to the performance and durability of the coatings. Two different ratios of adhesion binder to TEFLON AF (i.e., 1 to 1 and 2 to 1) were used in this example, and both types of adhesion binders described in EXAMPLE 1 were used.

It was found that the haze was higher for the samples where the adhesion binder to TEFLON AF ratio was higher. This was believed to be due to either some phase separation or differences in solvent drying speeds during the spin coating process. In terms of performance, the properties of the coatings appear similar, although for the samples that had a 2 to 1 ratio of adhesion binder to TEFLON AF, the abrasion resistance appeared to be slightly poorer (though within experimental error).

Example 5

Substrate Texture Dependence

In this example, the procedure described for preparing the samples of Group 3 of EXAMPLE 2 was used to evaluate the performance of various coatings, with the exception that the glass substrates were etched to provide a textured surface prior to the spin coating step. Both adhesion binders described in EXAMPLE 1 were implemented, and various ratios of adhesion binder to TEFLON AF were used in the study.

The coatings generally enveloped the textured features of the etched glass substrates to result in properties comparable to those exhibited by the samples that implemented unetched substrates. Table 2 provides transmission and haze data for various coatings that were spun coated on approximately 2 inch×2 inch etched and smooth substrates.

TABLE 2

| Sample | Fluoroalkyl-Containing Monomer of Adhesion Binder | Substrate Etched? | Adhesion Binder to TEFLON AF ratio | Transmittance | Haze |
|---|---|---|---|---|---|
| A | 2-(perfluorooctyl)-ethyl-methacrylate | Yes | 1:1 | 95.3 | 1.23 |
| B | 2-(perfluorooctyl)-ethyl-methacrylate | Yes | 1:1 | 95.8 | 1.72 |
| C | 2-(perfluorooctyl)-ethyl-methacrylate | Yes | 1:1 | 95.7 | 3.38 |
| D | 2-(perfluorooctyl)-ethyl-methacrylate | No | 1:1 | 95.9 | 1.42 |
| E | ZONYL | No | 1:1 | 96.1 | 1.07 |
| F | 2-(perfluorooctyl)-ethyl-methacrylate | No | 2:1 | 95.3 | 2.10 |
| G | 2-(perfluorooctyl)-ethyl-methacrylate | No | 2:1 | 95.0 | 3.14 |
| H | ZONYL (Control) | No | No TEFLON AF | 95.9 | 0.16 |
| I | Glass (Control) | No | No | 94.3 | 0.05 |

As seen in Table 2, the etched substrates did not produce coated articles with diminished haze or optical transmittance relative to coated articles implementing smooth substrates, and relative to uncoated pristine glass. In addition, the repeatability of these results is also evidenced in Table 2.

Table 3 provides water and oleic acid contact angles for various samples prepared in accordance with this example. The samples labels in Table 3 correspond to those provided in Table 2. The contact angle measurements were taken on the as-deposited coatings (labeled "Film") and on the coatings after wiping using a Crockmeter.

TABLE 3

| | Film | | 100 wipes | | 1000 wipes | |
|---|---|---|---|---|---|---|
| Sample | Average | Std Dev | Average | Std Dev | Average | Std Dev |
| Water Contact Angles | | | | | | |
| A | 121.0 | 0.5 | 119.2 | 0.8 | 121.0 | 0.2 |
| B | 117.3 | 0.7 | 121.6 | 0.7 | 121.9 | 1.3 |
| C | 116.7 | 0.5 | 121.5 | 0.9 | | |
| D | 120.1 | 0.6 | 119.3 | 0.8 | 120.3 | 0.6 |
| E | 120.4 | 0.3 | 118.6 | 0.7 | 119.9 | 0.9 |

TABLE 3-continued

| Sample | Film | | 100 wipes | | 1000 wipes | |
|---|---|---|---|---|---|---|
| | Average | Std Dev | Average | Std Dev | Average | Std Dev |
| F | 118.5 | 0.6 | 118.4 | 1.0 | 116.6 | 0.8 |
| G | 119.0 | 0.5 | 120.6 | 1.2 | | |
| H (Control) | 90.6 | 0.2 | 93.3 | 0.4 | 89.9 | 0.7 |
| Oleic Acid Contact Angles | | | | | | |
| D | 81.3 | 0.6 | 81.7 | 0.4 | | |

Prophetic Example 6

Composite Coatings

Nanoparticles can be incorporated into the coating compositions described herein to impart additional mechanical/coating strength. The nanoparticles can be silica, zirconia, ceria, or like material particles that have an average particle size that is less than or equal to about 60 nm in a longest cross-sectional dimension.

Prophetic Example 7

Adhesion Binder Formulation Adjustments

The adhesion binder formation can be altered to optimize the coating performance. For example, reduction of the number of silane groups in the co-polymer would result in a lower surface energy material. Other monomers (lower in cost) could be incorporated as filler, either to promote a closer packed crosslink system (smaller than C10 of the perfluoro monomer) or to enhance binding of another filler material (organic or inorganic).

Prophetic Example 8

Adhesion Binder with Fluorosilanes

The adhesion binder could also be used to chemically attach molecules, oligomers, and polymers, other than fluoropolymers, that contain an alcohol or even a silane group. The adhesion and durability could be improved by both chemical and mechanical crosslinking This method could utilize the multivalency of the crosslinkers to produce a highly crosslinked network that could mechanically interlock with polymeric species (branched or linear).

Example 9

Fingerprint Resistance Characterization

In this example, the fingerprint resistance of various samples produced in accordance with EXAMPLE 2 and EXAMPLE 5 was evaluated. These samples were compared to a commercially available fluorosilane-coated bare glass sample. The fluorosilane used was alkoxysilyl perfluoropolyether, which is commercially marketed as Dow Corning DC2634, as an "easy-to-clean" surface coating.

Table 4 provides a qualitative comparison of tactilely-transferable residue (synthetic sebum) transfer for each of the samples. The sample labels of EXAMPLE 2 and EXAMPLE 5 have been retained in Table 4, with the exception of the easy-to-clean sample, which is simply labeled as such. Since the easy-to-clean sample was the sample against which all others were compared, the fingerprint resistance value for this sample was rated as a "0." Samples that enabled transfer of a greater amount of tactilely-transferable residue than the easy-to-clean sample were rated with a "−." Samples that enabled transfer of a lesser amount of tactilely-transferable residue than the easy-to-clean sample were rated with a "+." If a sample enabled transfer of a significantly lower amount of tactilely-transferable residue than the easy-to-clean sample, it was rated with a "++." Thus, the order of decreasing tactilely-transferable residue transfer is: "−">"0">"+">"++" ("++" thus has the least transfer).

TABLE 4

| Sample | Pristine Coating | 100 wipes | 1000 wipes |
|---|---|---|---|
| I | − | | |
| Easy-To-Clean (Control) | 0 | | |
| Group 1 | − | − | |
| Group 3 | ++ | | + |
| F | ++ | | + |
| Group 2 | ++ | 0 | |
| A | ++ | | + |
| B | ++ | | + |
| H | − | | − |
| E | ++ | | 0 |

While the embodiments disclosed herein have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of the present disclosure or the appended claims.

We claim:

1. A coated article, comprising:

a substrate; and a fingerprint-resistant coating composition disposed on a surface of the substrate;

wherein the fingerprint-resistant coating composition comprises an adhesion binder and a fluoropolymer;

wherein the adhesion binder comprises a copolymer comprising a combination of fluoroalkyl-containing monomers and silane-containing monomers; and wherein the silane-containing monomers of the adhesion binder chemically adhere to the surface of the substrate and are at least partially crosslinked to one another to form a polymer network around the fluoropolymer that mechanically binds the fluoropolymer to the surface of the substrate.

2. The coated article of claim 1, wherein the substrate comprises a silicate glass, borosilicate glass, aluminosilicate glass, or boroaluminosilicate glass, and optionally comprises an alkali or alkaline earth modifier.

3. The coated article of claim 1, wherein the substrate is a glass-ceramic comprising a glassy phase and a ceramic phase, wherein the ceramic phase comprises β-spodumene, β-quartz, nepheline, kalsilite, or carnegieite.

4. The coated article of claim 1, wherein the substrate has an average thickness of about 0.02 millimeters to about 2 millimeters.

5. The coated article of claim 1, wherein the fluoroalkyl-containing monomers comprises fluoroalkylmethacrylate monomers.

6. The coated article of claim 1, wherein the fluoroalkyl-containing monomers comprises fluoroalkylalkyl-methacrylate monomers.

7. The coated article of claim 1, wherein the silane-containing monomers comprises alkoxysilylmethacrylate monomers.

8. The coated article of claim 1, wherein the silane-containing monomers comprises alkoxysilyl-alkylmethacrylate monomers.

9. The coated article of claim 1, wherein the fluoropolymer is an amorphous fluoropolymer.

10. The coated article of claim 1, wherein a haze of the coated article is less than or equal to about 5 percent.

11. The coated article of claim 1, wherein an optical transmittance of the coated article is greater than or equal to about 92 percent over a visible spectrum of light.

12. The coated article of claim 1, wherein after 1000 wipes with a microfiber cloth using a Crockmeter, contact angle between the coated article and water is greater than 110 degrees.

13. The coated article of claim 1, wherein the adhesion binder and the fluoropolymer are physically intertwined in a three-dimensional (3D) network on the surface of the substrate.

14. The coated article of claim 1, wherein the fluoropolymer is entrapped within the crosslinked silane-containing monomers.

15. A method of making a coated article, the method comprising:

providing a substrate;

disposing a fingerprint-resistant coating material on at least a portion of a surface of the substrate, wherein the fingerprint-resistant coating material comprises an adhesion binder and a fluoropolymer, wherein the adhesion binder comprises a copolymer comprising a combination of fluoroalkyl-containing monomers and silane-containing monomers; and at least partially crosslinking the silane-containing monomers to one another to form a three-dimensional network that physically intertwines the fluoropolymer to the at least a portion of the surface of the substrate.

16. The method of claim 15, wherein the fluoroalkyl-containing monomers of the adhesion binder-comprises fluoroalkylmethacrylate monomers.

17. The method of claim 15, wherein the fluoroalkyl-containing monomers of the adhesion binder comprises fluoroalkyl-alkyl-methacrylate monomers.

18. The method of claim 15, wherein the silane-containing monomers of the adhesion binder comprises alkoxysilylmethacrylate monomers.

19. The method of claim 15, wherein the silane-containing monomers of the adhesion binder comprises alkoxysilyl-alkyl-methacrylate monomers.

20. The method of claim 15, wherein the fluoropolymer is an amorphous fluoropolymer.

* * * * *